(12) United States Patent
Subbareddy et al.

(10) Patent No.: US 12,334,449 B2
(45) Date of Patent: Jun. 17, 2025

(54) SELECTIVE USE OF DIFFERENT ADVANCED INTERFACE BUS WITH ELECTRONIC CHIPS

(71) Applicant: Intel Corporation, Santa Clara, CA (US)

(72) Inventors: Dheeraj Subbareddy, Portland, OR (US); Ankireddy Nalamalpu, Portland, OR (US); Lai Guan Tang, Tanjung Bungah (MY); Mahesh K. Kumashikar, Bangalore (IN)

(73) Assignee: Altera Corporation, San Jose, CA (US)

( * ) Notice: Subject to any disclaimer, the term of this patent is extended or adjusted under 35 U.S.C. 154(b) by 922 days.

(21) Appl. No.: 17/033,655

(22) Filed: Sep. 25, 2020

(65) Prior Publication Data
US 2022/0102281 A1    Mar. 31, 2022

(51) Int. Cl.
*H01L 23/538* (2006.01)
*H01L 23/00* (2006.01)
*H01L 23/14* (2006.01)
*H01L 25/065* (2023.01)

(52) U.S. Cl.
CPC ........ *H01L 23/5386* (2013.01); *H01L 23/145* (2013.01); *H01L 23/5383* (2013.01); *H01L 24/16* (2013.01); *H01L 25/0655* (2013.01); *H01L 2224/16225* (2013.01)

(58) Field of Classification Search
CPC ............... H01L 23/5386; H01L 23/145; H01L 23/5383; H01L 24/16; H01L 25/0655; H01L 2224/16225; H01L 27/0207; H01L 23/50; H01L 24/05; H01L 24/13; H01L 2224/0237; H01L 2224/1301; G06F 30/39; G06F 2115/12; G06F 13/4068; G06F 15/7807
See application file for complete search history.

(56) References Cited

U.S. PATENT DOCUMENTS 9,082,763 B2 * 7/2015 Yu ................. H01L 21/4853
2020/0133902 A1 * 4/2020 Tang ............... G06F 13/4027

OTHER PUBLICATIONS

"Advanced Interface Bus Specification;" Intel Corporation, Oct. 26, 2018. (Year: 2018).*
"Chips Alliance Announces AIB 2.0 Draft Specification to Accelerate Design of Open Source Chiplets;" Chips Alliance, Jul. 16, 2020. (Year: 2020).*

(Continued)

*Primary Examiner* — Benjamin P Sandvik
*Assistant Examiner* — John Patrick Cornely
(74) *Attorney, Agent, or Firm* — Fletcher Yoder, P.C.

(57) ABSTRACT

A digitally communicative circuit may use standardized interfaces for connection and communication with other circuit components. Such digitally communicative circuit may benefit from using wider variety of interconnect schemes with the respective interfaces for transmission and reception of data. Some chiplets may communicate using a high data bandwidth interface while other chiplets may communicate using interfaces with lower data bandwidth. Alternate interface is introduced that may facilitate scaled communication with Advanced Interface Bus 2.0 without translation circuitry and with different data bandwidth.

20 Claims, 5 Drawing Sheets

(56) References Cited

OTHER PUBLICATIONS

"Advanced Interface Bus (AIB) Specification;" Chips Alliance, Jun. 17, 2022. (Year: 2022).*
"Advanced Interface Bus for Standard Packaging (AIB-O) Specification;" Chips Alliance, Aug. 3, 2021. (Year: 2021).*
David Kehlet, "Accelerating Innovation Through a Standard Chiplet Interface: The Advanced Interface Bus (AIB)," Intel, White Paper, The Advanced Interface Bus, pp. 1-9.

* cited by examiner

SELECTIVE USE OF DIFFERENT ADVANCED INTERFACE BUS WITH ELECTRONIC CHIPS

BACKGROUND OF THE DISCLOSURE

Background

The present disclosure relates generally to electronic devices using multiple communicative electronic chips (e.g., chiplets).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic systems and electronic devices are becoming more versatile and efficient in data processing to keep up with the ever-increasing push for faster data processing. Some data processing systems may include electronic devices that include multiple electronic chips and chiplets communicatively coupled to perform data processing tasks. The multiple chips, sometimes referred to as chiplets, in a data processing task may be programmable logic devices, application-specific integrated circuits, processors, transceivers, or any other electronic circuit component capable of digital communication.

The aforementioned digitally communicative circuit components may use different interfaces for connection and communication with other circuit components. Such digitally communicative circuit components may use different sets of interconnect schemes with the respective interfaces for transmission and reception of data. The use of the various interconnect schemes may be due to various sets of communication rules imposed by a protocol, such as different speed rates, voltage levels, data encoding and decoding methods, and physical layouts, among other things. However, there may be a lack of versatility with the interfaces of the digitally communicative circuit components with different communication capabilities. For example, different chips (e.g., chiplets) of the digitally communicative circuit components may communicate using different numbers of input/output (I/O) ports.

Specific interfaces in a specific digital component (e.g., chip or chiplet) may be best suited for a particular chip or chiplet design. Some chiplets may communicate using a high data bandwidth interface while other chiplets may communicate using with lower data bandwidth interfaces. Moreover, a scaled data processing system may use various chip or chiplets each using different numbers of I/O ports. Digital communication using high data bandwidth communication interfaces for all chiplets of such a scaled data processing system may be costly and inefficient. For example, the scaled data processing system may include one chiplet with high bandwidth while other communicating chiplets include circuitry with lower data bandwidth.

BRIEF DESCRIPTION OF THE DRAWINGS

Advantages of the disclosure may become apparent upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B.

Certain aspects commensurate in scope with the originally claimed disclosure are set forth below. It should be understood that these aspects are presented merely to provide the reader with a brief summary of certain forms of the disclosure might take and that these aspects are not intended to limit the scope of the disclosure. Indeed, the disclosure may encompass a variety of aspects that may not be set forth below.

Methods and systems for scaling die-to-die communication are described. Data processing systems may benefit from additional versatility from a chiplet interface to facilitate communication between chiplets having different bandwidth capabilities. For example, an additional or alternate interface may be used with chiplets having multiple different data bandwidths to facilitate communication with other chiplets. Different embodiments are described below to facilitate efficient communication between chiplets with different data bandwidths.

A chiplet or group of chiplets may include at least a die, an interface layer, and packaging. The interface layer may facilitate digital communication between the die and other chiplets or chips. The interface layer may be implemented using a physical layer to provide high data bandwidth or a different physical layer to provide lower data bandwidth. A data bandwidth density of the physical layer may depend on a number and proximity of conductive traces within the physical layer. An application of the chiplet in a processing system (e.g., based on communication capability of other die within a system of chiplets or chips) may impose data bandwidth specifications for the interface layer. As such, the die may be packaged with an interface layer including a high-density physical layer to provide a high data bandwidth or a low-density physical layer to provide a lower data bandwidth.

Packaging the same die with different interface layers with different data bandwidths may facilitate versatile and scalable processing system design. However, such interface layers may use the same communication protocols. That is, an interconnection scheme associated with physical layers of such interface layers with different data bandwidth may facilitate data communication with similar protocols.

That said, a system of chips (e.g., chiplets) may include multiple specified (e.g., standardized) chiplet interfaces to facilitate scalable system design. For example, a processing system may use a high data bandwidth density interface technology (e.g., an embedded multi-die interconnect bridge (EMIB)) with a low data bandwidth density interface technology. As such, the complexity of system design may be reduced using different interface layers with higher data bandwidth and lower data bandwidth while using the same communication protocol. Methods and systems for using die-to-die interface scaling for high interconnect density EMIB/interposer to low-interconnect-density package traces are described.

Assisting packaging technology for implementing high data bandwidth density chiplets (e.g., with organic substrates) may be used for a variety of purposes. Some chiplet interfaces may be directed to advanced packaging. For example, in different embodiments, a chiplet may use an Embedded Multi-die Interconnect Bridge (EMIB), a silicon interposer, or active interposer, among other chiplet interface technologies. However, such advanced packaging technologies may have more associated costs for providing high functionality that may not be involved in some applications. For example, some analog to digital convertors (ADCs), digital to analog converters (DACs), and transceivers, among other things, may only require a fraction of data bandwidth density provided by the chiplet interfaces with such advanced packaging technologies.

A scalable packaging technology may be useful to provide sufficient functionality commensurate with design requirements in different chip (e.g., chiplet) applications. Such a scalable packaging technology may provide a cost-effective communication solution between a system of chiplets while preserving functionality of chiplets and providing cost effective solution for system design implementation.

As will be appreciated, different chiplet interface (and/or interconnect) layers may use different manufacturing processes and/or different materials. An interface layer may include a redistribution layer (RDL), a number of bumps, and a substrate that includes conductive traces to enable external communication with other chiplets or chips. As such, a cost associated with implementation of a respective chiplet, chip, or system of chips may vary based on the interface layers used with chiplets to facilitate data communication. For example, some chiplets may use an Advanced Interface Bus 1.0 (AIB 1.0) interconnect implemented on a substrate made of organic material. A relatively small concentration of traces within the substrate and a relatively small bandwidth density implemented on the RDL and the bumps of the interface layer provides for the use of organic material with the AIB 1.0. Moreover, AIB 1.0 may facilitate communication using a first communication protocol.

On the other hand, Advanced Interface Bus 2.0 (MB 2.0) may include high data bandwidth with concentrated RDL and bumps in the respective interface layer (high density) and highly concentrated traces within the respective substrate. However, the highly concentrated interface layer uses denser and finer connections within the RDL, finer bump sizes, and more sophisticated substrate materials to facilitate finer interface and interconnection with other chiplets. As such, AIB 2.0 may be implemented using more expensive substrate or bump materials, such as silicon. Moreover, AIB 2.0 may facilitate communication using a second communication protocol different from the first communication protocol.

Some advanced chiplets may communicate with other advanced chiplets with high data bandwidth within a communication system. Such communication system may benefit from using Advanced Interface Bus 2.0 (AIB 2.0) interconnect technology. However, some other communication systems may use communications between an advanced chiplet communicating (using the AIB 2.0) with another chiplet with lower data bandwidth density (using the AIB 1.0). Such communication may not be viable due to the use of different communication protocol by AIB 1.0 and AIB 2.0. AIB 2.0 may facilitate communication between the advanced chiplet and the other chiplet. However, using MB 2.0 for chiplets that are capable of performing adequately using the lower bandwidth interface increases a cost of the system because of high density interface incorporated using a more expensive substrate (e.g., silicon).

AIB-O is described hereinafter for facilitating communication using a communication protocol usable with (and similar to) the MB 2.0 protocol, while including less dense conductors in an interface layer of the chiplet (including the RDL and bumps) and less density in substrate. AIB-O may facilitate communication between the advanced chiplet and the other chiplet (with less data bandwidth) using organic materials for the interface layer and substrate to lower the cost. AIB-O may include a fraction of bumps used with AIB 2.0 while using the similar communication protocols (e.g., interconnect scheme) on similar footprints. While this disclosure describes using AIB 2.0 and AIB-O as two possible protocols that may be used, any other suitable protocols related in a similar way may be used (e.g., higher bandwidth with finer interconnections; lower bandwidth with coarser interconnections).

Figure 1:
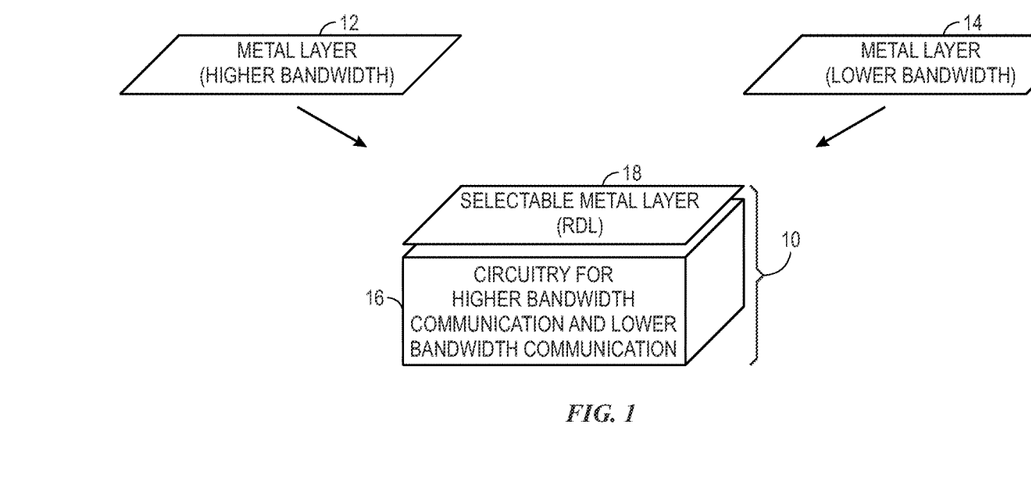
FIG. 1 depicts a chiplet with an advanced interface bus 2.0 (AIB 2.0) or an advanced interface bus-O (AIB-O), in accordance with an embodiment.

Referring now to FIG. 1, a chiplet 10 may include an AIB 2.0 layer 12 or an AIB-O layer 14. Although the following discusses AIB 2.0 and AIB-O, similar techniques may be applied to similar high-density and low-density protocols and/or layers. Incorporating the AIB 2.0 layer 12 or the AIB-O layer 14 with the chiplet 10 may be selectable at the time of manufacturing the chiplet 10, as will be appreciated. The chiplet 10 may include a respective die 16. The die 16 may include multiple layers of processing elements, such as a logic layer or a transistor layer, and may communicate using different data bandwidth. For example, the die 16 may be facilitate a field programmable gate array (FPGA), digital signal processor (DSP), an application specific integrated circuit (ASIC), hard logic, soft logic, among other things. Nevertheless, the die 16 may communicate with one or more other chiplets via an interface layer, such as the AIB 2.0 layer 12 or AIB-O layer 14, incorporated on a selectable layer 18.

The chiplet 10 may communicate with other die (e.g., chiplets, chips) using the selectable layer 18 that may incorporate the interface layer. In some embodiments, the selectable layer 18 may include one or more top metal layers of the chiplet 10 to facilitate an interconnection scheme between the die 16 and external circuitry. As such, the chiplet 10 may include the die 16 packaged with the selectable layer 18 to provide data communication using a data communication protocol. The data communication protocol may include a specific data rate, frequency, bandwidth density, etc. In different embodiments, the selectable layer 18 may be manufactured using different materials (e.g., silicon, organic materials) to facilitate data communication with the other die using the respective interface layer (e.g., AIB 2.0 layer 12 or the AIB-O layer 14).

The selectable layer 18 may include an RDL layer and bumps, among other things. The RDL layer and bumps may facilitate data communication between the die 16 and other chiplets via a substrate. In specific embodiments, to facilitate digital communication with other chiplets, the die 16 may use the same communication protocol when the chiplet 10 is using the MB 2.0 layer 12 or the AIB-O layer 14. Moreover, because the AIB 2.0 layer 12 or the AIB-O layer 14 may facilitate communication using the same communication protocol, the die 16 may communicate with other chiplets with an MB 2.0 scheme or an AIB-O scheme.

The AIB-O layer 14 may enable a fraction (e.g., ½, ⅓, ¼, etc.) of data bandwidth as compared to the AIB 2.0 layer 12 using the same footprint while using the same communication protocol. For example, the die 16 may be communicatively coupled to another chiplet with a relatively high data bandwidth. As such, the die 16 may be implemented using the AIB 2.0 layer 12 to facilitate the high data bandwidth. However, in another example, the die 16 may be communicatively coupled to a different chiplet with a relatively lower data bandwidth density. As such, the die 16 may be implemented using the AIB-O layer 14 to facilitate the relatively lower data bandwidth. The die 16 may communicate with the other chiplets using the same communication protocol in both examples. In some embodiments, the MB-0 layer 14 may include a fraction (e.g., ½, ⅓, ¼, etc.) of the bumps used with an MB 2.0 scheme on the same footprint (e.g., selectable metal layer 18). As such, a bandwidth density of a physical layer of the AIB-O layer 12 (including the RDL and the bumps) may be a fraction of a bandwidth density of a physical layer of the AIB 2.0 layer 14. In other embodiments, the AIB-O layer 14 may be parameterized and a manufacturer may provide the chiplet 10 with AIB-O layer 14 using different ratios compared to AIB 2.0 layer 12 (e.g., 8:1, 4:1, 2:1 and 1:1).

In some cases, the selectable layer 18 may include different physical properties when using the MB 2.0 layer 12 or the AIB-O layer 14. That is, because the AIB-O layer 14 includes a smaller number of bumps compared to the AIB 2.0 layer 12 on the same footprint, the chiplet 10 incorporated with the AIB-O layer 14 may be manufactured using a wider variety of materials. For example, the AIB-O layer 14 may include organic material for RDL layer and bumps, whereas the AIB 2.0 layer 12 may include silicon in the RDL layer and bumps to incorporate the higher-density layer with finer design and implementation. It should be appreciated that, in specific embodiments, a die 16 may communicate using the AIB 2.0 layer 12, the AIB-O layer 14, or a combination of the two interface layers on different portions (e.g., different I/O banks) of the same footprint (e.g., selectable metal layer 18) to facilitate data communication.

In a first embodiment, the chiplet 10 may use the die 16 with the AIB 2.0 layer 12 to communicate with one or more other chiplets with high data bandwidth (e.g., 256 Gbps). The AIB 2.0 layer 12 may use an advanced circuitry material, including high data bandwidth density in the physical layer, to facilitate such data communication. For example, the AIB 2.0 layer 12 may use Micro-bumps (μbumps) implemented using silicon substrate material. In specific embodiments, the μbumps may have a pitch lower than the bumps used in the AIB-O layer. For example, the pitch may be 20 mm, 25 mm, 30 mm, 35 mm, 40 mm, 45 mm, 50 mm, 55 mm, 60 mm, or another suitable pitch to effectively communicate at a sufficiently high bandwidth. While the μbumps or the silicon substrate may increase the manufacturing cost associated with the chiplet 10, the AIB 2.0 layer 12 may also enable the chiplet 10 to communicate with one or more other chiplets with lower data bandwidth density capabilities than AIB 2.0 specifications.

In a second embodiment, the chiplet 10 may use the die 16 with the AIB-O layer 14 to communicate with one or more other chiplets at a lower data bandwidth (e.g., 56 Gbps). The second embodiment may be used when communication at lower data bandwidths are sufficient for communication with the one or more other chiplets. The AIB-O layer 14 may provide an interface having a lower data bandwidth density in a respective physical layer between the chiplet 10 (e.g., high cost die or chiplet) and a lower-cost die or chiplets using lower data bandwidth density in the physical layer (e.g., EDL layer and bumps).

As previously noted, the AIB-O layer 14 may provide a fraction of data communication bandwidth compared to AIB 2.0 layer while preserving other functionality of the die 16 (e.g., same communication protocol). The AIB-O layer 14 may also include a lower number of bumps used in the top layer of the chiplet 10 compared to the MB 2.0 layer 12. In specific embodiments, the AIB-O layer 14 may facilitate data communication using C4 bumps and the AIB 2.0 layer 12 may facilitate data communication using μbumps. The C4 bumps may be wider and may occupy more space on a top layer of the chiplet 10 compared to μbumps. An implementation of the C4 bumps for die to die communication interfaces may allow the use of a wider variety of materials for manufacturing the bumps compared to μbumps. For example, a die may use the AIB-O layer 14 to communicate with other die through organic material substrates. As such, the AIB-O layer 14 may provide scalable communication with other chiplets that use lower data communication bandwidth densities while preserving other functionality (e.g., frequency, data rate, etc.) of the die 16.

The use of the AIB-O layer 14 with the die 16 may reduce associated manufacturing costs while enabling scalable designs by reducing an edge data bandwidth per unit perimeter. As such, the AIB-O layer 14 and the MB 2.0 layer 12 may facilitate scalable system designs by accounting for a tradeoff between data bandwidth density for die-to-die communication and implementation cost by providing different chiplets using the same die 16.

In some embodiments, an FPGA may be implemented using the AIB-O layer 14. Depending on an application and a bandwidth density for the application, the cost of system implementation may be reduced by replacing the AIB 2.0 layer 12 with the AIB-O 14 using the same FPGA. That is, the FPGA may be implemented using a first metal layer with the AIB-O layer 14 or a second metal layer using the AIB 2.0 layer 12 (with different packaging technologies). As a result, two different versions of the FPGA may be manufactured using the same die. In other embodiments, an ASIC or other processing block may use the AIB-O layer 14.

Figure 2:
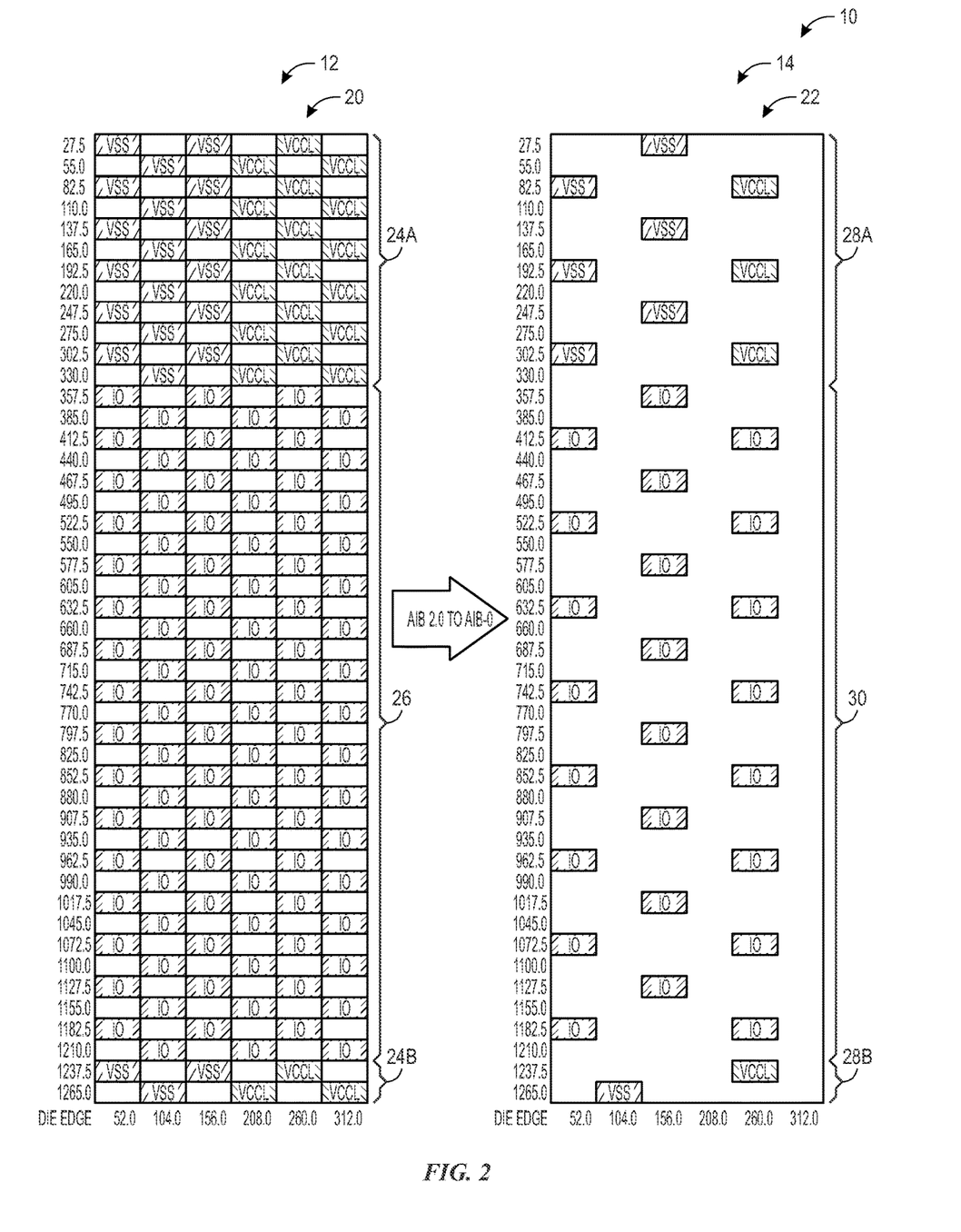
FIG. 2 depicts input/output (I/O) of an AIB 2.0 scheme and an AIB-O scheme, in accordance with an embodiment.

With the foregoing in mind, FIG. 2 depicts I/O ports 20 associated with the AIB 2.0 layer 12 and I/O ports 22 associated with the AIB-O layer 14. A processing system such as a system on a chip or other computing component may include the chiplet 10. A first embodiment of the chiplet 10 may use the AIB 2.0 layer 12 with the AIB 2.0 I/O ports 20 and a second embodiment of the chiplet 10 may use the MB-O layer 14 with the AIB-O I/O ports 22. The first and the second embodiments may use the same die (e.g., die 16 of FIG. 1) with the chiplet 10. As such, an interface layer (selectable layer 18 of FIG. 1) may be implemented using the AIB 2.0 layer 12 including the AIB 2.0 I/O ports 20 or the AIB-O layer 14 including the MB-O I/O ports 22 on the same footprint (top metal layer of the chiplet 10). In the specific examples shown in FIG. 2, the AIB 2.0 I/O ports 20 may be implemented using μbumps and the AIB-O I/O ports 22 may be implemented using C4 bumps.

In FIG. 2, the AIB-O I/O ports 22 may include a fraction of the number of I/O as the AIB 2.0 I/O ports 20 on the same footprint, as will be appreciated. For example, the μbumps may be implemented using a finer pitch size while C4 bumps may be implemented using wider pitch size. As such, the smaller number of I/O ports associated with AIB-O I/O ports 22 may facilitate lower data bandwidth density (per perimeter) on the chiplet 10. For example, an AIB-O scheme, including the AIB-O I/O ports 22 (using C4 bumps), may facilitate data communication using a fraction of data bandwidth as compared to an AIB 2.0 scheme, including the AIB 2.0 I/O ports 20 (using μbumps), while facilitating communication of a die (e.g., the die 16 of FIG. 1) with other chiplets using the same communication protocol as AIB 2.0 scheme. As such, while the AIB-O scheme may include a physical layer (including the AIB-O I/O ports 22) with a lower bandwidth density, the interface between the die and other chiplets (using AIB 2.0 scheme or AIB-O scheme) may remain consistent.

In specific embodiments with respect to FIG. 2, the AIB-O I/O ports 22 may include a quarter of the number of I/O ports as compared to the AIB 2.0 I/O ports 20. For example, each C4 bump (used to facilitate AIB-O I/O ports 22) may be wider and may occupy more space compared to a μbump (used to facilitate AIB 2.0 I/O ports 20). In these embodiments, fewer data communication routes may be used/assigned between the die and other communicative chiplets. For example, the AIB-0 layer 14 may use a specific RDL with AIB-O I/O ports 22 that reconnects the die I/O to C4 bumps of the chiplet 10 to facilitate data communication. Moreover, a consistent communication protocol may facilitate data transmission and reception using the die of chiplet 10 and other chiplets using the AIB 2.0 I/O ports 20 with an MB 2.0 scheme or the AIB-O I/O ports 22 with an AIB-O scheme to facilitate scalable design in a system of chiplets.

As described above, the AIB-O I/O ports 22 may facilitate data communication using a fraction of a full-bandwidth density of the chiplet 10 (and the respective die). In specific embodiments, the AIB-O I/O ports 22 may facilitate using the fraction of the full-bandwidth density of the chiplet 10 to provide design scalability to system design using chiplet 10. For example, the die may communicate with one or more other chiplets that use part of the full-bandwidth density of the die. Moreover, such communication may be implemented using only one or a number of channels of the chiplet 10. An RDL layer of the chiplet 10 associated with the AIB-O layer 14 may facilitate routing of communications between the die and the AIB-O I/O ports 22.

The AIB 2.0 I/O ports 20 may include a power I/O portion 24A, a power I/O portion 24B, and a communication I/O portion 26, among other portions. The power I/O portion 24A and the power I/O portion 24B may include I/O ports with input power pins or output power pins for the chiplet 10. The communication I/O portion 26 may include I/O ports for data communication via the die of the chiplet 10. In some embodiments, the power I/O portion 24A, the power I/O portion 24B, and the communication I/O portion 26 may be user-configurable. Moreover, in different embodiments, the AIB 2.0 I/O 20 may include different I/O portions or combinations of I/O portions.

The AIB-O I/O ports 22 may include a power I/O portion 28A, a power I/O portion 28B, and a communication I/O portion 30. The power I/O portion 28A and the power I/O portion 28B may be associated with input power pins or output power pins of the chiplet 10. The communication I/O portion 26 may include I/O ports for data communication via the die of the chiplet 10. In some embodiments, the power I/O portion 28A, the power I/O portion 28B, and the communication I/O portion 30 may be user configurable. Moreover, in different embodiments, the AIB-O I/O ports 22 may include different I/O portions or combinations of I/O portions.

As depicted in FIG. 2 and described above, the AIB-O I/O ports 22, including the power I/O 28A, the power I/O 28B, and the communication I/O 30, may include a fraction of the number of I/O ports as compared to the AIB 2.0 I/O ports 20. The AIB-O layer 14 may be implemented using a wider variety of manufacturing material, such as organic materials. As such, the AIB-O layer 14 may facilitate scalable and cost-effective system designs for communicating with other chiplets using the AIB-O I/O ports 22 (with an AIB-O scheme) or AIB 2.0 I/O ports 20 (with an AIB 2.0 scheme).

Figure 3:
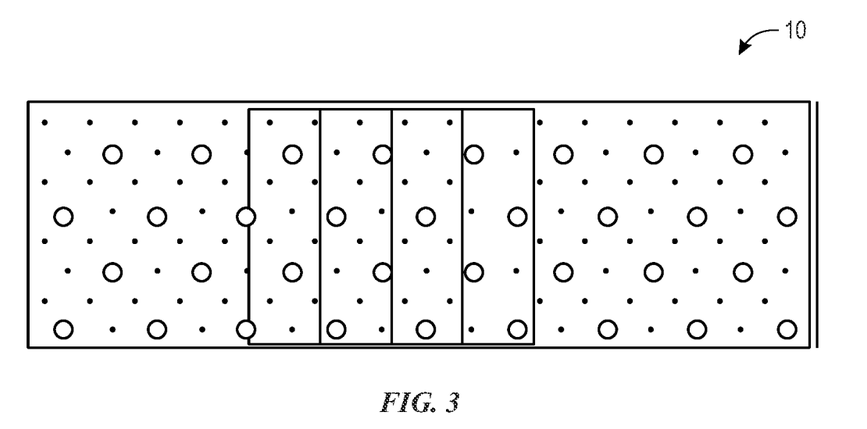
FIG. 3 depicts a perspective view of the AIB 2.0 and the AIB-O of FIG. 1, in accordance with an embodiment.

Referring now to FIG. 3, I/O pins associated with the AIB 2.0 layer 12 and the AIB-0 layer 14 are overlayed on the top metal layer of the chiplet 10 in a perspective view for comparison. As mentioned above, in different embodiments, the one or more top layers of a die, such as the die 16 of FIG. 1, of the chiplet 10 may use one or the other interface bus technologies (e.g., MB 2.0 or AIB-O) for data communication with other die. The overlayed perspective view of FIG. 3 provides an illustrative comparison between the respective I/O pins of the MB 2.0 layer 12 and the AIB-0 layer 14. It should be noted that FIG. 3 may depict only a portion of the chiplet 10.

In FIG. 3, a number of I/O pins associated with the AIB 2.0 layer 12 are implemented using μbumps and other I/O pins associated with the AIB-O layer 14 are implemented using C4 bumps. In some embodiments, the μbumps may use pitch bumps having a narrower pitch (e.g., 45 mm), whereas the C4 bumps may use relatively wider pitch bumps. As such, the number of C4 bumps disposable on the AIB-O layer 12 may be a fraction of the μbumps disposable on the AIB 2.0 layer 12. In specific embodiments, the μbumps may be implemented using a silicon substrate for implementing high data bandwidth density in a more sophisticated design. The C4 bumps may be implemented using a substrate with a wider variety of substrate materials that may enable using the die in applications when lower data bandwidth is sufficient. For example, the C4 bumps may be implemented using organic materials because of the smaller bandwidth density used in the physical layer. As described above, the μbumps may be associated with the AIB 2.0 layer and used with EMIB technology while the C4 bumps may be used to implement the AIB-0 layer 14 with the AIB-O scheme.

Each depicted I/O bank may include a number of I/O pins to facilitate data communication between the chiplet 10 and other chiplets. In some embodiments, each I/O bank may be associated with one or more functional blocks of the die determined at the time of manufacturing. Alternatively, the I/O banks may be user configurable after the manufacturing process. Nevertheless, in different embodiments, each I/O bank may be associated with a number of the μbumps or the C4 bumps. As described above and depicted in the embodiment of FIG. 3, each I/O bank may use a first number of pins when using μbumps with the AIB 2.0 layer 12, or a fraction of the first number of pins when using the C4 bumps with the AIB-0 layer 14. The different number of bumps is partly due to different pitch sizes used with different bump technologies. As such, each I/O bank may communicate using a physical interface layer with a higher data bandwidth density when using the μbumps compared to C4 bumps (the AIB 2.0 layer 12 and the AIB-O layer 14).

It should be noted that the use of μbumps and C4 bumps are with respect to specific embodiments and other embodiments may use other bumps with the chiplet 10. For example, in the AIB-O scheme, the chiplet 10 may use a fraction (e.g., three quarters, half, one quarter, one tenth) of the bumps (or I/O pins) compared to the AIB 2.0 scheme, which allows the AIB-O layer 14 to use various bump technologies because of lower design restrictions. That is, AIB-O layer 14 is not limited to C4 bumps.

Moreover, the top metal layer of the chiplet 10 may include one or more layers or sub-layers for routing of the I/O pins to the respective ports on the die. For example, when using the AIB 2.0 layer 12, the chiplet 10 may include an RDL for directing the μbumps to the respective sections or ports of the die. Similarly, when using the AIB-O layer 14, the chiplet 10 may include another RDL for connecting the C4 bumps to the respective parts of the die.

With the foregoing in mind, in some embodiments, the AIB-O layer 14 may use an RDL on the top metal layer of the chiplet 10 similar to that of AIB 2.0 layer 12. In such embodiments, one or more I/O pins of the die may not be used since AIB-O layer 14 may use a fraction of bumps compared to AIB 2.0 layer 12. In other embodiments, an RDL associated with the AIB-O layer 14 may include routing circuitry for making the AIB-O layer 14 bumps compatible with the die I/O ports. As such, the RDL associated with the AIB-0 layer 14 may facilitate the reduced data bandwidth density of the die 16 on the same footprint by not using a number of the die I/O ports or rewiring the die I/O ports.

A manufacturer may use the AIB 2.0 layer 12, the AIB-0 layer 14, or a combination of the two (e.g., on different I/O banks) to implement the top layers of the chiplet 10. In some embodiments, the chiplet 10 may include different interfaces on different channels or different sides of the package. In some other embodiments, a first chiplet may include one or more interfaces using the AIB 2.0 layers 12 and a second chiplet may include one or more interfaces using the AIB-O layer 14. A die may use the AIB 2.0 layer 12 for communication with advanced chiplets using high data bandwidth or use the AIB-O layer 14 for communication with chiplets with lower data bandwidth. The die may include the same processing circuitry in either embodiments (e.g., logic circuitry, transistor layer, etc.) connected to AIB 2.0 layer 12 or AIB-O layer 14. The AIB-O scheme implemented by the AIB-O layer 14 may facilitate similar functionality but with reduced data bandwidth density when the die is in communication with other die with lower data bandwidth while using the same protocol as the AIB 2.0 scheme. As such, system designs may benefit from scalable designs using the AIB-O layer 14 and the AIB 2.0 layer 12.

Figure 4:
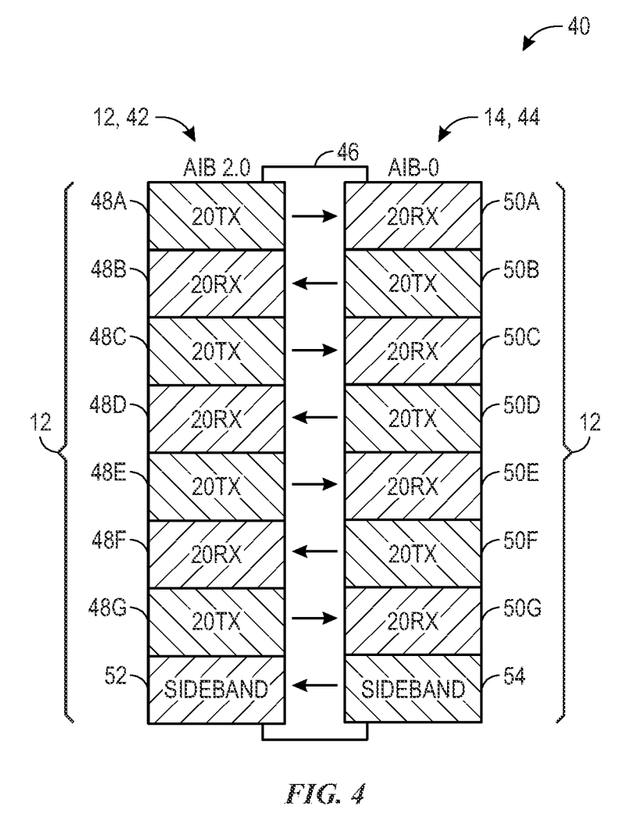
FIG. 4. depicts a first and a second chiplet communicatively coupled using the AIB-O scheme and AIB 2.0 scheme interface, in accordance with an embodiment.

FIG. 4. depicts an example communication system 40. The communication system 40 may include a first chiplet 42 and a second chiplet 44. The first chiplet 42 and the second chiplet 44 may be communicatively coupled via a substrate 46. The first chiplet 42 and the second chiplet 44 may each include one of an FPGA, Application Specific Integrated Circuit (ASIC), a transceiver, a processor (e.g., CPU or GPU), or the like. The first chiplet 42 may communicatively couple to the substrate 46 using the AIB 2.0 layer 12 and the second chiplet 44 may communicatively couple to the substrate 46 using the AIB-O layer 14.

The AIB 2.0 layer 12 associated with the first chiplet 42 may include channels 48. The channels 48A to 48G may each communicate as a transmitter or receiver channel. For example, the channels 48A, 48C, 48E, and 48G may be configured to transmit communication data to the second chiplet 44, whereas, the channels 48B, 48D, and 48F may be configured to receive communication data from the second chiplet 44.

Similarly, the AIB-O layer 14 associated with the second chiplet 44 may include channels 50A, 50B, 50C, 50D, 50E, 50F, 50G. The channels 50A to 50G may be configurable to operate as a transmitter or receiver channel. In the example of FIG. 4, the channels 50A, 50C, 50E, and 50G are configured to transmit communication data to the first chiplet 42, whereas, the channels 50B, 50D, and 50F are configured to receive communication data from the first chiplet 42. It should be noted that in other embodiments, the first chiplet 42 and the second chiplet 44 may include different numbers of channels and may communicate using different configurations of channels (e.g., transmitter and receiver channels).

In some embodiments, a sideband 52, associated with the first chiplet 42, and a sideband 54, associated with the second chiplet 44 may include channel configuration data. For example, the sideband 52 may store configuration data associated with an architecture of channels 48 and the sideband 52 may store configuration data associated with an architecture of channels 50. The sideband 52 and the sideband 54 may transmit the respective configuration data to configure the respective AIB 2.0 layer 12 and the AIB-O layer 14 to facilitate assignment of the respective I/O pins.

The AIB 2.0 layer 12 may include high data bandwidth density on physical layers associated with the channels 50A to 50G. The AIB 2.0 layer 12 may include μbumps. The AIB-O layer 14 may include smaller data bandwidth density on physical layers associated with the channels 50A to 50G. The AIB-O layer 14 may include C4 bumps. As previously noted, the C4 bumps associated with the AIB-O layer 14 may be a fraction of the μbumps associated with the AIB 2.0 bumps. However, the first chiplet 42 and the second chiplet 44 may communicate using the same communication protocol without a translation circuitry between the AIB 2.0 layer 12 and the AIB-O layer 14. As such, the first chiplet 40 and the second chiplet 42 may communicate using the same clocking, initialization, self-tuning, and sideband architecture that will scale across varying data widths to facilitate the use of the same eco-system across multiple physical technologies.

The AIB-O layer 14 may have different physical characteristics compared to the AIB 2.0 layer. Due to the smaller number of bumps, the second chiplet 44 may use a smaller bandwidth density for the respective interface layer. Moreover, the substrate 46 may include a smaller number of traces with less physical density. For example, the smaller number of bumps of the AIB-O layer 14 may limit a number of traces and the density and concentration of the traces within the substrate 46 for data communication between the first chiplet 42 and the second chiplet 44. As such, a wider variety of manufacturing material (e.g., cost-effective material) may be used for the substrate 46. However, this AIB-O layer 14 may communicate using similar clocking, initialization, self-tuning and sideband architectures. A such, the AIB-O layer 12 may scale across different chiplets with different data widths to facilitate an ecosystem of chiplets across multiple physical technologies with different bandwidth density.

Figure 5:
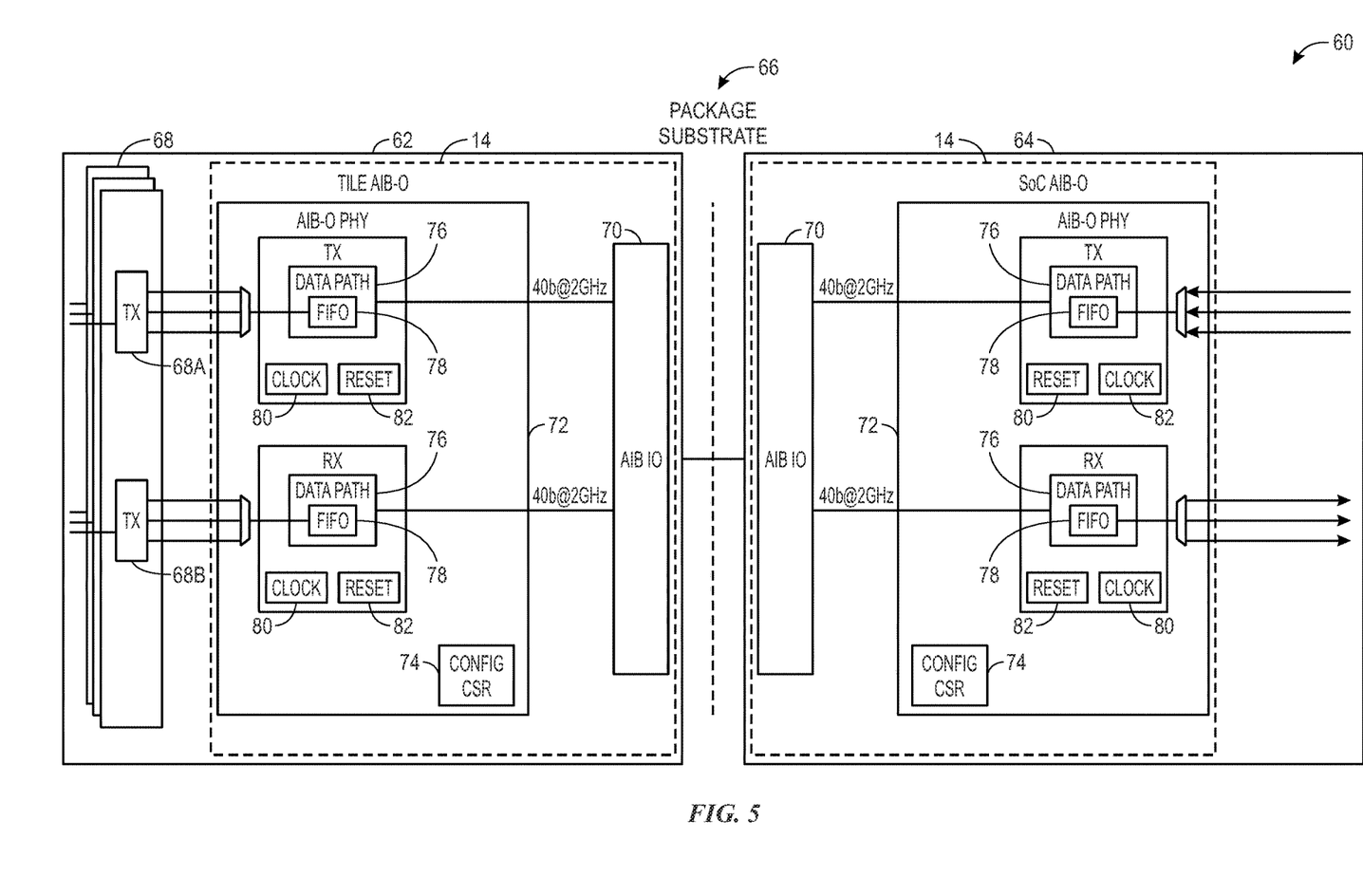
FIG. 5 depicts a first and a second chiplet communicatively coupled using the AIB-O scheme interfaces, in accordance with an embodiment.

Referring now to FIG. 5, a first chiplet 62 and a second chiplet 64 may communicate using AIB-O layers 14 in a communication system 60. In different embodiments, the first chiplet 62 or the second chiplet 64 may be an FPGA, an ASIC, a transceiver, a processor (e.g., CPU or GPU), or the like. A substrate 66, similar to substrate 46 of FIG. 4, may facilitate communication between the first chiplet 62 and the second chiplet 64. For example, the first chiplet 62 and the second chiplet 64 may each include a number (e.g., 16, 18, 20, 22, 24, 26, 30, 32) C4 bumps (not shown in FIG. 5) to transfer data at a corresponding rate (e.g., 1 Gbps, 2 Gbps, 4 Gbps, 6 Gbps, 8 Gbps).

In the depicted embodiment, the first chiplet 62 may include communication channels 68 including a transmission channel 68A and a receiver channel 68B. The communication channels 68 may provide the data for transmission using the AIB-O layer 14. The AIB-O layer 14 may facilitate data communication using AIB-O scheme in each of the first chiplet 62 and the second chiplet 64. An example embodiment of circuitry associated with the AIB-O layer 14 is described with respect to communication system of FIG. 5.

Each of the AIB-O layers 14 may include an AIB-O I/O block 70 and an AIB-O physical layer 72. The AIB-O I/O block 70 may include C4 bumps as described with respect to FIG. 3 or other viable bump technologies. The AIB-O I/O block 70 may include bump architectures with respect to AIB-O I/O ports 22 described with respect to FIG. 2. The AIB-O physical layer 72 may be associated with RDL and provide processing and routing circuitry to facilitate data communication. In one embodiment, the AIB-O physical layer 72 may facilitate data communication using the functional blocks described herein and with respect to FIG. 5.

The AIB-O physical layer 72 may include a configuration data register 74, a data path block 76, a first-in-first-out register (FIFO) 78, a clock 80, and a reset 82. However, it should be appreciated that in different embodiments, the AIB-O physical layer 72 may include different circuitry and circuit blocks. The configuration data register 74 may include data indicative of architecture of the AIB-O physical layer 72 (e.g., which channels 50 are configured as receivers, transmitters, or not used). For example, a sideband, such as the sideband 54 of FIG. 4 may provide the configuration data for the configuration data register 74. The data path block 76 may include the FIFO 78, clock 80, and reset 82 to facilitate routing of the data between the communication channels 68 and the AIB-O I/O block 70. In some embodiments, a respective RDL layer may incorporate the data path block 76. In different embodiments, the FIFO 78 may receive and transmit data for transmission or reception. The clock 80 may facilitate a rate at which the FIFO 78 may transmit data. The reset 82 may be triggered by a control signal to reconfigure the data path block 76. For example, the configuration data register 74 may provide such a trigger signal.

Figure 6:
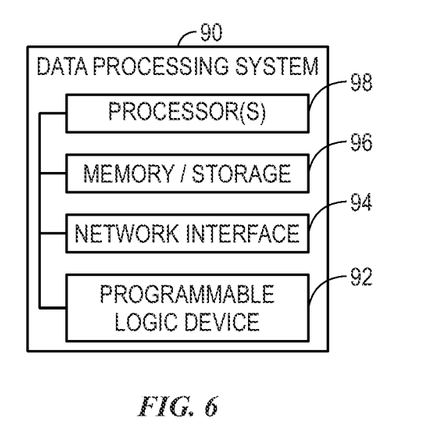
FIG. 6 depicts a transmitter circuitry and receiver circuitry coupled between chiplets of the package of FIG. 1, in accordance with an embodiment.

A data processing system 90 may include one or more programmable logic devices 92 incorporating the flexible interface techniques discussed herein, shown in FIG. 6. The data processing system 90 includes a processor 98, memory and/or storage circuitry 96, and a network interface 94. In one example, the data processing system 90 may utilize the AIB-O scheme (i.e., AIB-O layer 14). The data processing system 90 may include more or fewer components (e.g., electronic display, user interface structures, application specific integrated circuits (ASICs)). The processor 98 may include any suitable processor, such as an INTEL® XEON® processor or a reduced-instruction processor (e.g., a reduced instruction set computer (RISC), an Advanced RISC Machine (ARM) processor) that may manage a data processing request for the data processing system 90 (e.g., to perform machine learning, video processing, voice recognition, image recognition, data compression, database search ranking, bioinformatics, network security pattern identification, spatial navigation, or the like). The memory and/or storage circuitry 96 may include random-access memory (RAM), read-only memory (ROM), one or more hard drives, flash memory, or the like. The memory and/or storage circuitry 96 may be considered external memory to the programmable logic device 92 and may hold data to be processed by the data processing system 90. In some cases, the memory and/or storage circuitry 96 may also store configuration programs (e.g., bitstream) for programming the programmable logic device 92. The network interface 94 may enable the data processing system 90 to communicate with other electronic devices and may perform the communication by the way of the AIB-O scheme (using the AIB-O layer 14) or the MB 2.0 scheme (e.g., using the AIB 2.0 layer 12). Furthermore, the processor 98, the programmable logic device 92 and/or the memory and/or storage circuitry 96 may utilize different communication features and may benefit from the AIB-0 layer or AIB 2.0 layer. The use of AIB-O layer or AIB 2.0 layer in between the functional blocks of the data processing system 90 may enable scalable design using the functional blocks and may reduce a cost of circuit implementation, among other things.

In one example, the data processing system 90 may be part of a data center that processes a variety of different requests. For instance, the data processing system 90 may receive a data processing request via the network interface 94 to perform machine learning, video processing, voice recognition, image recognition, data compression, database search ranking, bioinformatics, network security pattern identification, spatial navigation, or some other specialized task. The processor 98 may cause the programmable logic fabric of the programmable logic device 92 to be programmed with a particular accelerator related to requested task. For instance, the processor 98 may instruct that configuration data (bitstream) stored on the memory and/or storage circuitry 96 or cached in sector-aligned memory of the programmable logic device 92 to be programmed into the programmable logic fabric of the programmable logic device 92. The configuration data (bitstream) may represent a circuit design for a particular accelerator function relevant to the requested task. Due to the high density of the programmable logic fabric, the proximity of the substantial amount of sector-aligned memory to the programmable logic fabric, or other features of the programmable logic device 92 that are described here, the programmable logic device 92 may rapidly assist the data processing system 90 in performing the requested task. Indeed, in one example, an accelerator may assist with a voice recognition task less than a few milliseconds (e.g., on the order of microseconds) by rapidly accessing and processing large amounts of data in the accelerator using sector-aligned memory.

Placement of computation and memory in spatial architectures where compute and memory have three-dimensional spatial locality may be performed statically. Additionally or alternatively, the programmable logic device 92 may dynamically allocate, relocate, and de-allocate compute and memory on such spatial architectures. These techniques enable the static mapping and dynamic management of systems using such architectures. Moreover, using flexible allocation schemes enables the programmable logic device 92 to find and support improved (e.g., optimal) co-placement of compute with memory in a static setting in a known sequence of static settings and in a dynamic setting when the allocation of compute and memory is not known a priori. Such usage of static and/or dynamic placement in a three-dimensional spatial locality provides the ability to extend compilation to support the simultaneous synthesis, placement, and routing of spatial computation with a spatially distributed memory to enable users to leverage an architecture with a much richer memory sub-system. The support for dynamic management of the computation and memory allows users/administrators to build dynamic runtime systems for spatial architectures for the programmable logic device 92.

Furthermore, the AIB-O layer 14 eliminates translation using translation circuitry between certain communicative components to provide flexibility of using different technologies for the data processing system 90. For instance, the data processing system 90 may use the AIB-O layer 14 to readily communicate using the same protocols with different interface hard layers for a reduced time-to-market for each sub-component. For instance, new technologies may be used with other technologies (e.g., medium-dependent interface (MDI)) without redesigning pre-existing devices using the other technologies or designing the new technologies with different interface compatibility incorporated therein. Such compatibility may enable consistent communication between processors 98 (e.g., INTEL XEON®) and/or programmable logic devices 92 while reducing system implementation costs for the data processing system 90 compared to alternative tile interconnect approaches.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

EXAMPLE EMBODIMENT 1. A semiconductor device comprising:
an interface comprising:
a physical layout of circuitry configured to be compatible with a high-speed protocol between die; and
a plurality of bumps having a density less dense than specified for the high-speed protocol and suitable for a low-speed protocol, wherein the interface is configured to communicate using the high-speed protocol.

EXAMPLE EMBODIMENT 2. The semiconductor device of example embodiment 1, comprising one or more die communicatively coupled to the die-to-die interface via a redistribution layer.

EXAMPLE EMBODIMENT 3. The semiconductor device of example embodiment 1, wherein a first die is communicatively coupled to a second chiplet via the interface.

EXAMPLE EMBODIMENT 4. The semiconductor device of example embodiment 3, wherein the first die and the second chiplet are configured to communicate using an advance interface bus (AIB) 2.0 protocol.

EXAMPLE EMBODIMENT 5. The semiconductor device of example embodiment 4, wherein the interface is configured to have a throughput that is a fraction of the AIB 2.0 protocol throughput.

EXAMPLE EMBODIMENT 6. The semiconductor device of example embodiment 5, wherein the throughput is equal to or less than 64 Gigabits per second.

EXAMPLE EMBODIMENT 7. The semiconductor device of example embodiment 5, wherein the throughput is of the interface is less than or equal to one quarter specified for AIB 2.0.

EXAMPLE EMBODIMENT 8. The semiconductor device of example embodiment 5, wherein the throughput is parametrized and configurable by a manufacturer of the semiconductor device.

EXAMPLE EMBODIMENT 9. The semiconductor device of example embodiment 1, comprising a substrate made of organic materials to which the plurality of bumps are coupled.

EXAMPLE EMBODIMENT 10. The semiconductor device of example embodiment 1, wherein the bumps have a pitch wider than 45 millimeter.

EXAMPLE EMBODIMENT 11. The semiconductor device of example embodiment 1, wherein the bumps comprise C4 bumps.

EXAMPLE EMBODIMENT 12. A chiplet comprising:
a die having a first communication channel; and
a first interface associated with the first communication channel, wherein the interface comprises:
circuitry configured to support an advanced interface bus 2.0 (AIB 2.0) protocol connection; and
a plurality of bumps having a density less dense than specified for the AIB 2.0 protocol, wherein the first interface is configured to communicate using the AIB 2.0 protocol.

EXAMPLE EMBODIMENT 13. The chiplet of example embodiment 12, comprising a redistribution layer that facilitates connection between the plurality of bumps and the die.

EXAMPLE EMBODIMENT 14. The chiplet of example embodiment 13, wherein the chiplet is communicatively coupled to a second chiplet via the interface.

EXAMPLE EMBODIMENT 15. The chiplet of example embodiment 12, wherein the interface is configured to have a throughput that is a fraction of a throughput corresponding to the AIB 2.0 protocol.

EXAMPLE EMBODIMENT 16. The chiplet of example embodiment 12, wherein the bumps comprise C4 bumps.

EXAMPLE EMBODIMENT 17. The chiplet of example embodiment 12, wherein the die comprises a second channel comprising a second interface comprising an additional plurality of bumps having a density specified for the AIB 2.0 protocol, and wherein the second interface is configured to communicate using the AIB 2.0 protocol.

EXAMPLE EMBODIMENT 18. A chip comprising:
a top metal layer; and
a redistribution layer, wherein the redistribution layer is configured to selectively use a first interface layer with a first communication architecture or a second interface layer with a second communication architecture as the top metal layer, wherein the first interface layer comprises a fraction of a number of bumps of the second interface layer, wherein the first communication architecture and the second communication architecture are configured to communicate using a same communication protocol.

EXAMPLE EMBODIMENT 19. The chip of example embodiment 18, wherein the same communication protocol comprises an advanced interface bus (AIB).

EXAMPLE EMBODIMENT 20. The chip of example embodiment 18, wherein the first interface layer comprises micro-bumps and the second interface layer comprises C4 bumps.

What is claimed is:

1. A semiconductor device comprising:
a first die comprising a first interface coupled to input/output ports of the first die, wherein the first interface comprises:
a physical layer having a footprint compatible with a second interface of a second die having a higher bandwidth and compatible with a third interface of a third die having a lower bandwidth; and
a first set of bumps having a first density less dense than a second density of a second set of bumps of the second interface and corresponding to a third density of a third set of bumps of the third interface;
wherein the first die is configured to directly couple to and communicate with the second die based on coupling the first interface to the second interface, wherein the second set of bumps comprises a number of unused bumps when the first interface is directly coupled to the second interface.

2. The semiconductor device of claim 1, comprising a redistribution layer communicatively coupling the first interface to the first die.

3. The semiconductor device of claim 1, wherein the first die and the second die are configured to communicate using similar and different communication protocols.

4. The semiconductor device of claim 1, wherein the first interface is configured to have a throughput that is a fraction of that of the second interface.

5. The semiconductor device of claim 1, wherein a throughput of the first interface is equal to or less than 64 Gigabits per second.

6. The semiconductor device of claim 1, wherein a throughput of the first interface is less than or equal to one quarter of a throughput of the second interface.

7. The semiconductor device of claim 1, wherein a throughput of the first interface is parametrized and configurable by a manufacturer of the semiconductor device.

8. The semiconductor device of claim 1, comprising a substrate made of organic materials and comprising the first set of bumps.

9. The semiconductor device of claim 1, wherein the first set of bumps have a pitch wider than 45 millimeter.

10. The semiconductor device of claim 1, wherein the first set of bumps comprise C4 bumps.

11. A system comprising:
a first semiconductor device comprising:
a first die comprising a first interface coupled to input/output ports of the first die, wherein the first interface comprises:
a physical layer having a footprint compatible with a second interface of a second die having a higher bandwidth and compatible with a third interface of a third die having a lower bandwidth; and
a first set of bumps having a first density less dense than a second density of a second set of bumps of the second interface and corresponding to a third density of a third set of bumps of the third interface;
wherein the first die is configured to directly couple to and communicate with the second die based on coupling the first interface to the second third interface, wherein the second set of bumps comprises a number of unused bumps when the first interface is directly coupled to the second interface; and
a second semiconductor device, wherein the first die is communicatively coupled to the second semiconductor device via the first interface.

12. The system of claim 11, wherein the first die and the second die are configured to communicate using similar and different communication protocols.

13. The system of claim 11, wherein the first interface is configured to have a throughput that is a fraction of that of the second interface.

14. The system of claim 11, wherein a throughput of the first interface is equal to or less than 64 Gigabits per second.

15. The system of claim 11, wherein a throughput of the first interface is less than or equal to one quarter of a throughput of the second interface.

16. The system of claim 11, wherein a throughput of the first interface is parametrized and configurable by a manufacturer of the first semiconductor device.

17. The system of claim 11, comprising a substrate made of organic materials and comprising the first set of bumps.

18. The system of claim 11, wherein the first set plurality of bumps comprise C4 bumps or have a pitch wider than 45 millimeter.

19. The semiconductor device of claim 1, wherein the first die is configured to couple to and communicate with the third die based on coupling the first interface to the third interface.

20. The system of claim 11, wherein the first die is configured to couple to and communicate with the third die based on coupling the first interface to the third interface.

* * * * *